(12) United States Patent
Ojamies et al.

(10) Patent No.: US 11,138,209 B2
(45) Date of Patent: Oct. 5, 2021

(54) DATA PROCESSING SYSTEM AND METHOD

(71) Applicant: Palantir Technologies Inc., Palo Alto, CA (US)

(72) Inventors: Petri Ojamies, London (GB); James Dickinson, London (GB); Martin Seebach, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 156 days.

(21) Appl. No.: 16/511,625

(22) Filed: Jul. 15, 2019

(65) Prior Publication Data

US 2020/0364230 A1    Nov. 19, 2020

(30) Foreign Application Priority Data

May 15, 2019  (GB) ..................................... 1906869

(51) Int. Cl.
  *G06F 17/00* (2019.01)
  *G06F 16/2457* (2019.01)
  *G06F 16/29* (2019.01)
  *G06F 5/01* (2006.01)

(52) U.S. Cl.
  CPC ........ *G06F 16/24575* (2019.01); *G06F 16/29* (2019.01); *G06F 5/012* (2013.01)

(58) Field of Classification Search
  CPC .. G06F 16/24575; G06F 16/29; G06F 16/116; G06F 5/012
  See application file for complete search history.

(56) References Cited

U.S. PATENT DOCUMENTS

| | | | |
|---|---|---|---|
| 7,983,691 B1 * | 7/2011 | Wong ...................... | H04W 4/02 455/456.1 |
| 2019/0102387 A1 * | 4/2019 | Kumar .................. | H04W 4/021 |

* cited by examiner

*Primary Examiner* — Greta L Robinson
(74) *Attorney, Agent, or Firm* — McAndrews, Held & Malloy, Ltd.

(57) ABSTRACT

A data pipeline system includes a binary data extractor to receive a data portion identifier, extract a portion of a binary data item based on the data portion identifier; and output the portion of the binary data item. A data iterator provides a first data portion identifier to the binary data extractor, receives, from the binary data extractor, a first portion of the binary data item, determines a second data portion identifier, provides the second data portion identifier to the binary data extractor, receives, from the binary data extractor, a second portion of the binary data item, and outputs the second portion of the binary data item. A data converter receives, from the data iterator, the second portion of the binary data item; and transforms, based on a data format specification, at least the second portion of the binary data item for processing by components of the data pipeline system.

19 Claims, 8 Drawing Sheets

600

Determine a First Closest Landmark Location Indicator for a First Location Indicator 610

Determine a Second Closest Landmark Location Indicator for a Second Location Indicator 620

Determine a Distance based on the Second Location Indicator and the First Closest Landmark Location Indicator 622

Calculate Bounding Area based on the Distance 624

Determine the Second Closest Landmark Location Indicator based on the Bounding Area 626

Figure 5

DATA PROCESSING SYSTEM AND METHOD

RELATED APPLICATIONS/INCORPORATION BY REFERENCE

The present application claims the benefit of United Kingdom Patent Application No. 1906869.1, filed on May 15, 2019, and entitled "Data Processing System and Method." The above-identified application is hereby incorporated herein by reference in its entirety.

TECHNICAL FIELD

The present disclosure relates to systems and methods for processing data.

BACKGROUND

Computers are very powerful tools for processing information. This information is likely to be of various types and formatted in numerous ways. In some circumstances, the provided information may not be in the desired form to be processed by some particular computerized system.

A computer system may include a data pipeline system. A typical data pipeline system is a collection of computer software scripts and programs for processing data extracted from "data sources" and for providing the processed data to "data sinks". A data pipeline system may include data components for transforming the data into a form suitable for further processing by other components of the data pipeline system or some other particular computerized system. A typical data pipeline system will also store the extracted data and/or some transformation of it.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

According to a first aspect, there is provided a data pipeline system comprising:
  a binary data extractor configured to:
    receive a data portion identifier;
    extract a portion of a binary data item based on the data portion identifier; and
    output the portion of the binary data item;
  a data iterator configured to:
    provide a first data portion identifier to the binary data extractor;
    receive, from the binary data extractor, a first portion of the binary data item;
    determine a second data portion identifier;
    provide the second data portion identifier to the binary data extractor;
    receive, from the binary data extractor, a second portion of the binary data item; and
    output the second portion of the binary data item; and
  a data converter configured to:
    receive, from the data iterator, the second portion of the binary data item; and
    transform, based on a data format specification, at least the second portion of the binary data item for processing by one or more other components of the data pipeline system.

The data iterator may be configured to output the first portion of the binary data item. The data converter may be configured to receive, from the data iterator, the first portion of the binary data item. The data converter may be configured to transform the first and the second portions of the binary data item.

The data portion identifier may comprise at least one of a data superframe identifier, a data frame identifier, a data subframe identifier, a data word identifier and/or a data line identifier.

Determining the second data portion identifier may comprise extracting, from the first portion of the binary data item, a reference to a second portion of the binary data item, and wherein the second data portion identifier is based on the reference to the second portion of the binary data item.

One or more components of the data pipeline system may be configured to store the transformation of at least the second portion of the binary data item to a database, wherein access to the database is restricted to one or more users.

Transforming at least the second portion of the binary data item may comprise: determining a scaling factor based on the data format specification; and transforming at least part of the second portion of the binary data item to a numerical value based on the scaling factor.

The numerical value may be in a floating point format.

According to another aspect, there may be provided a method, performed by one or processors, comprising:
  providing, by a data iterator, a first data portion identifier to a binary data extractor;
  receiving, by the binary data extractor, the first data portion identifier;
  extracting, by the binary data extractor, a first portion of a binary data item based on the first data portion identifier;
  outputting, by the binary data extractor, the first portion of the binary data item;
  receiving, by the data iterator, the first portion of the binary data item from the binary data extractor;
  determining, by the data iterator, a second data portion identifier;
  providing, by the data iterator, the second data portion identifier to the binary data extractor;
  receiving, by the binary data extractor, the second data portion identifier;
  extracting, by the binary data extractor, a second portion of the binary data item based on the second data portion identifier;
  outputting, by the binary data extractor, the second portion of the binary data item;
  receiving, by the data iterator, the second portion of the binary data item from the binary data extractor;
  outputting, by the data iterator, the second portion of the binary data item;
  receiving, by the data converter, the second portion of the binary data item, from the data iterator; and
  transforming, by the data converter, based on a data format specification, at least the second portion of the binary data item for processing by one or more components of a data pipeline system.

The first data portion identifier and the second data portion identifier may each comprise at least one of a data frame identifier, a data subframe identifier and/or a data word identifier.

Determining the second data portion identifier may comprise extracting, from the first portion of the binary data item, a reference to a second portion of the binary data item, and wherein the second data portion identifier is based on the reference to the second portion of the binary data item.

The method may further comprise storing the transformation of at least the second portions of the binary data item to a database, wherein access to the database is restricted to one or more users.

Transforming at least the second portion of the binary data item may comprise:
determining a scaling factor based on the data format specification; and
transforming at least part of the second portion of the binary data item to a numerical value based on the scaling factor.

The numerical value may be in a floating point format.

According to another aspect, there may be provided a method, performed by one or more processors, comprising:
  receiving a plurality of landmark location indicators;
  receiving a first dataset comprising a time series of location indicators;
  determining, for each of the time series of location indicators, a respective closest landmark location indicator of the plurality of landmark location indicators; and
  obtaining, based on the first dataset, a second dataset comprising the respective closest landmark location indicator for each of the time series of location indicators.

Determining, for each of the time series of location indicators, a respective closest landmark location indicator of the plurality of landmark location indicators may comprise:
  determining a first closest landmark location indicator for a first location indicator in the time series of location indicators;
  determining a second closest landmark location indicator for a second location indicator in the time series of location indicators by:
    determining a distance based on the second location indicator and the first closest landmark location indicator;
    calculating a bounding area based on the distance;
    determining the second closest landmark location indicator based on the bounding area.

Determining the second closest landmark location indicator based on the bounding area may comprise selecting a subset of the plurality of landmark location indicators based on the bounding area.

Determining the second closest landmark location indicator based on the bounding area may further comprise: in response to the subset consisting of one landmark location indicator, determining the second closest landmark location indicator to be the same as the first closest landmark location indicator.

Determining the second closest landmark location indicator based on the bounding area may further comprise, in response to the subset comprising multiple landmark location indicators: for each of the multiple landmark location indicators, determining a respective distance based on the respective landmark location indicator and the second location indicator; and determining the second closest landmark location indicator to be the landmark location indicator for which the respective distance is smallest.

Access to the first dataset may be restricted to a first one or more users.

According to a further aspect, there may be provided a computer program, optionally stored on a non-transitory computer readable medium, which, when executed by one or more processors of a data processing apparatus cause the data processing apparatus to carry out a method according to any preceding method statement.

The apparatus according to any preceding statement may comprise one or more processors or special-purpose computing hardware.

BRIEF DESCRIPTION OF THE DRAWINGS

The features of the subject innovations are set forth in the appended claims. However, for purpose of explanation, several aspects of the disclosed subject matter are set forth in the following figures.

FIG. 5 is a flow diagram illustrating an example method for determining closest landmark location indicators for location indicators, in accordance with example embodiments;

DETAILED DESCRIPTION

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

Example Computer System

Figure 1:
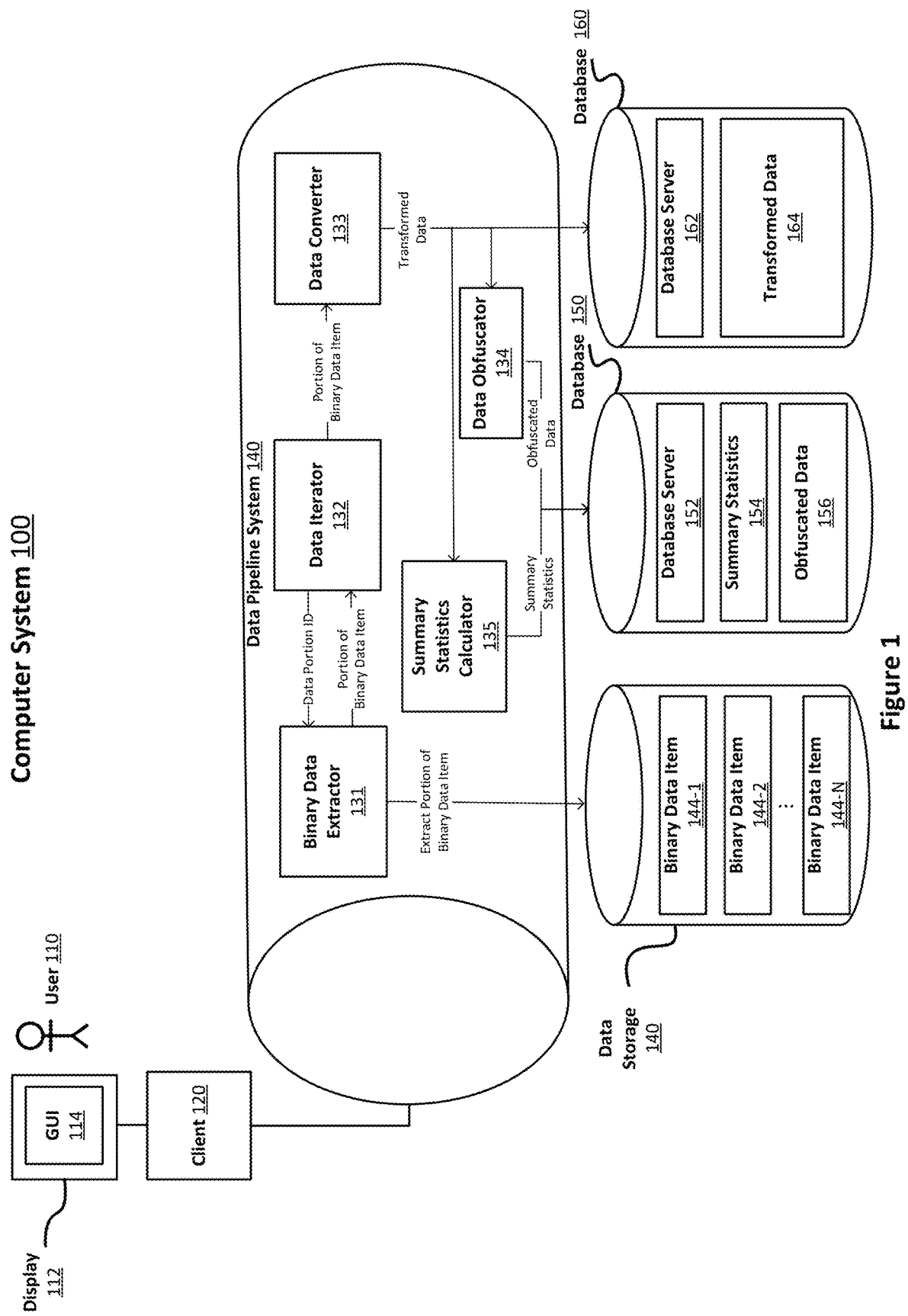
FIG. 1 is a block diagram illustrating an example of a computer system configured to extract portions of binary data items as part of a data processing pipeline, in accordance with example embodiments.

FIG. 1 illustrates an example of a computer system 100 configured to process binary data items. As shown, the computer system 100 includes a client computing device 120 used by a human user 110, a data pipeline system 130, data storage 140, a first database 150, and a second database 160. The client computing device 120 and the data pipeline system 130 may be configured to communicate with one another via a network (not shown). The network may include the Internet, an intranet, a local area network, a wide area network, a wired network, a wireless network, and a virtual private network (VPN). For ease of understanding, various components of the system have each been described with reference to one or more computing devices. It should be noted that, in some embodiments, any number of these components may be collocated on the same computing device.

The client computing device 120 may for instance be a laptop computer, a desktop computer, a mobile phone, a personal digital assistant (PDA), a tablet computer, a netbook, a television with one or more processors, embedded therein or coupled thereto, a physical machine or a virtual machine. The client computing device 120 may include one or more of a keyboard, a mouse, a display 112, or a touch screen (of which display 112 may be a part of). For example, the client computing device 120 may be composed of hardware components like those of basic computing device 500 described below with respect to FIG. 8. The client computing device 120 may also include a web browser or a client application configured to display, in a graphical user interface 114 of the display 112, a computer program for processing binary data items. Such a computer program may allow the user to indicate the data, e.g. the parameters, that they wish to extract and transform of the binary data items 144. It may also allow the user to specify other operations that should be performed by the data pipeline system 130. The graphical user interface 114 may be a web browser window, a client application window, an operating system window, an integrated development environment window, a virtual terminal window or other computer graphical user interface window. While only one user 110 and one client computing device 120 are illustrated in FIG. 1, the subject innovations may be implemented in conjunction with one or more users 110 and one or more client computing devices 120.

The data pipeline system 130 is configured to extract portions of binary data items 144 stored on data storage 140, process the extracted portions of the binary data items 144 to obtain processed data, and store the processed data on either or both of the first database 150 and the second database 160.

The data pipeline system 130 may include one or more processors (e.g., CPUs), a network interface, and memory. The processor(s) may be configured to execute computer instructions that are stored in one or more computer-readable media, for example, the memory of the data pipeline system 130. The data pipeline system 130 may include a network interface that is configured to allow the data pipeline system 130 to transmit and receive data in a network, e.g. a network connecting the data pipeline system 130 to the data storage 140, a network connecting the data pipeline system to the first database 150, and a network connecting the data pipeline system to the second database 160. These networks may be the same network or may be separate networks. The network interface may include one or more network interface cards (NICs).

The data pipeline system 130 includes a binary data extractor 131. The binary data extractor 131 may be configured to receive a data portion identifier, e.g. from a data iterator 132; extract a portion of a binary data item 144 based on the data portion identifier; and output the portion of the binary data item.

The data portion identifier may be received using any suitable mechanism, e.g. an application programming interface (API) call, a system call, a function call, a remote service call, or via a representational state transfer (REST) operation. The data portion identifier may be a low-level indicator of a segment of the binary data item. For example, the data portion identifier may include at least one of a data superframe identifier, a data frame identifier, a data subframe identifier and/or a data word identifier. An example of a binary data item format whereby data may be extracted using the above identifiers is described in relation to FIG. 3. The data portion identifier may alternatively or additionally include a byte number or byte range.

The binary data extractor 131 may extract the portion of the binary data item 144 based on the data portion identifier by using the data portion identifier to locate and read the relevant portion of the binary data item 144. The binary data extractor 131 may load a larger portion of the binary data item 144 than that identified by the data portion identifier in to a memory, e.g. a random access memory (RAM), of the data pipeline system 130 such that further portions of the binary data item 144 are present in the memory. If a data portion identifier subsequently received by the binary data extractor 131 identifies one or more of these loaded portions then the binary data extractor 131 may utilize these already loaded portions reducing the number of reads of the binary data item from the data storage 140.

The binary data extractor 131 may output the portion of the binary data item by any suitable mechanism. For example, the binary data extractor 131 may output the portion of the binary data item by returning the portion of the binary data item in response to a function call, system call, an API call, a remote service call or a REST operation. The call or operation may have included the data portion identifier or the data portion identifier may have been included in an earlier call, i.e. the outputting may be synchronous or asynchronous. Alternatively or additionally, the binary data extractor 131 may output the portion of the binary data item by storing it in memory shared by one or more processes and/or threads.

The data pipeline system 130 includes the data iterator 132. The data iterator 132 may be configured to provide a first data portion identifier to the binary data extractor 131; receive a first portion of a binary data item 144 from the binary data extractor 131; determine a second data portion identifier; provide the second data portion identifier to the binary data extractor 131; receive a second portion of the binary data item 144 from the binary data extractor 131; and output the second portion of the binary data item 144. The data iterator 132 may be further configured to output the first portion of the binary data item 144. The order of these operations should not be considered limiting. The described operations may be performed in any feasible ordering or some of the operations may be performed concurrently. For example, the first portion of the binary data item and the second portion of the binary data item may be outputted together.

The data iterator 132 may provide the first data portion identifier to the binary data extractor using any suitable mechanism, e.g. an application programming interface (API) call, a system call, a function call, a remote service call, or via a representational state transfer (REST) operation. The first data portion identifier may take any of the forms described above. The first data portion identifier may be hardcoded in the data iterator or may have been received from a data converter 133 or another component via a suitable mechanism.

The data iterator 132 may receive a first portion of the binary data item from the binary data extractor 131 via any suitable mechanism e.g. an application programming interface (API) call, a system call, a function call, a remote service call, or via a representational state transfer (REST) operation. The data iterator 132 may receive the first portion of the binary data item in response to providing the first data portion identifier or may receive it in a later operation, i.e. the receiving may be synchronous or asynchronous.

The data iterator 132 may use a buffer to keep portions of the binary data item available to the data iterator for random access. The contents in the buffer may be replaced as further portions of the binary data item 144 are received. The buffer used by the data iterator 132 may be small, e.g., use a small amount of memory compared to the amount of memory used by the binary data extractor 131 for storing the further portions of the binary data item 144.

The data iterator 132 may determine the second data portion identifier based on the first data portion identifier. The data iterator may determine 132 the second data portion identifier based on the first data portion identifier by incrementing, or performing another arithmetic operation on, one or more aspects of the first data portion identifier. For example, a data superframe identifier, a data frame identifier, a data subframe identifier and/or a data word identifier may be incremented. Where the first portion of the binary data item is representative of a certain parameter recorded at a given time step, the second data portion identifier may be determined, e.g. by incrementing the first data portion identifier, such that it identifies a portion of the binary data item representative of the same parameters at a later time step. For example, data representative of a parameter, e.g. altitude, may be in the binary data item once every data frame, where each data frame may correspond to data recorded over a time period of a given length e.g. four seconds, at the same data subframe and word locations, so by incrementing the data frame identifier but holding the other aspects of the data portion identifier constant, the next instance of data representative of the same parameter may be located.

The data iterator 132 may determine the second data portion identifier based on the first portion of the binary data item 144. The first portion of the binary data item 144 may include a reference to a second portion of the binary data item 144, e.g. a byte address or data superframe, frame, subframe, and/or word identifiers. The second data portion identifier may be determined based on the reference such that it identifies the relevant portion of the binary data item 144.

The data iterator 132 may provide the second data portion identifier to the binary data extractor 131 by any of the same mechanisms by which the first data portion identifier is provided to the binary data extractor.

The data iterator 132 may receive the second portion of the binary data item from the binary data extractor 131 by any of the same mechanisms by which the first portion of the binary data item is received.

The data iterator 132 may output the second portion of the binary data item by any suitable mechanism. For example, the data iterator 132 may output the second portion of the binary data item by returning the portion of the binary data item in response to a function call, system call, an API call, a remote service call or a REST operation. The call or operation may have included the first data portion identifier or the first data portion identifier may have been included in an earlier call, i.e. the outputting may be synchronous or asynchronous. Alternatively or additionally, the data iterator 132 may output the second portion of the binary data item by storing it in memory shared by one or more processes and/or threads.

In embodiments where the data iterator 132 is further configured to output the first portion of the binary data item 144, the data iterator 132 may output the first portion of the binary data item 144 using any of the same mechanisms by which the second portion of the binary data item 144 is outputted.

The data pipeline system 130 includes a data converter 133. The data converter 133 may be configured to receive the second portion of the binary data item from data iterator; and to transform at least the second portion of the binary data item for processing by one or more other components of a data pipeline system. The data converter 133 may provide the transformation of at least the second portion of the binary data item to one or more other components of the data pipeline system. The data converter 133 may also store the transformation of at least the second portion of the binary data item, the transformed data 164, to a database, e.g. the second database 160. The data iterator may also provide a data portion identifier or another command to the data iterator, and the receiving of the portion(s) of the binary data item may be in response to this. Where the data iterator 132 outputs the first portion of the binary data item, the data converter 133 may be configured to receive the first portion of the binary data item from the data iterator. The described operations may be performed in any feasible ordering or some of the operations may be performed concurrently. For example, the first portion of the binary data item and the second portion of the binary data item may be received together.

The data converter 133 may receive the second portion of the binary data item from the data iterator 132 via any suitable mechanism e.g. an application programming interface (API) call, a system call, a function call, a remote service call, or via a representational state transfer (REST) operation.

The data converter 133 may receive the first portion of the binary data item from the data iterator by any of the same mechanisms by which the second portion of the binary data item may be received.

The data converter 133 may transform at least the second portion of the binary data item by transforming the binary data in one of or both of the portions of the binary data to a format that is practicably usable by one or more other components of the data pipeline system 130. Where the data converter 133 is configured to receive the first portion of the binary data item, the first and second portions of the binary data item may be transformed.

The data converter 133 may transform the binary data to a numerical value. The numerical value may be in a floating point format, e.g. an IEEE754 format, or in an integer format, e.g. a 32-bit or 64-bit signed or unsigned integer. The data converter may transform the binary data to a numerical value based on a scaling factor included in the data format specification. The scaling factor may be determined based on the data format specification by extracting or reading it from the specification. The scaling factor may be a single number indicating a top end of a range or may comprise two or more numbers indicating a top and a bottom end of a range. The use of these specific scaling factors for given binary data portions, which may correspond to specific parameters, facilitates the binary data item representing numbers efficiently, in terms of the number of bits used, and with a high precision. For example, if it is known that a given parameter, e.g. a temperature, is between 0 and 100 then it can be represented to a precision of $100/2^{11} \approx 0.05$ with 12 bits. Standard numerical formats are designed to handle numbers over a much greater range so would not be capable of representing the number accurately with as high a precision using this number of bits.

The data converter 133 may transform the binary data to a string value. For example, the data converter may transform the binary data to an ASCII or Unicode string format from a compact binary representation.

The data pipeline system 130 may include a data obfuscator 134. The data obfuscator 134 may be configured to receive and obfuscate the transformation of the binary data, i.e. the transformed data 164, such that the data may be usefully analyzed while obscuring information that is sensitive for security and/or privacy reasons. The data obfuscator may perform a number of obfuscation operations. The obfuscation operations may include removing parts of the data, changing the order of the data, applying perturbations to the data, and limiting the precision of the data. Location information may be obfuscated by a method such as method 400 described in relation to FIG. 4. The obfuscated data 156 may be stored to the first database 150 for analysis by one or more users who are restricted from accessing the transformed data 164.

The data pipeline system 130 may also include a summary statistics calculator 135. The summary statistics calculator may process the transformed data to calculate one or more summary statistics, e.g. means, variances and correlations. The precision of these summary statistics may be increased by deriving them based on the transformed data 164, as opposed to the obfuscated data 156, but, as they summarize a plurality of data, the summary statistics may not require obfuscation. The summary statistics 154 may be stored to the first database 150 for analysis by one or more users who are restricted from accessing the transformed data 164.

The data storage 140 may be one or more computing device(s), e.g. one or more file server(s). The data storage computing device(s) may include one or more processors (e.g., CPUs), a network interface, and memory. The processor(s) may be configured to execute computer instructions that are stored in one or more computer-readable media, for example, the memory of the data storage computing device(s). The data storage computing device(s) may include a network interface that is configured to allow the data storage computing device to transmit and receive data in one or more networks. The network interface may include one or more network interface cards (NICs).

The data storage 140 may be one or more storage media accessible by the data pipeline system. For example, the one or more storage media may be a solid state memory module, a hard disk drive, a solid state drive, a floppy disk or an optical data storage medium.

The data storage stores one or more binary data items 144. Each of the one or more binary data items may be in any suitable format, e.g. the format described in relation to FIG. 3.

The first database 150 may include a database server module 152 for storing and retrieving data including the data summary statistics 154 and the obfuscated data 156. The first database 150 may be implemented as a single server computing device or as multiple server computing devices arranged in a distributed or clustered computing arrangement. Each such server computing device may be composed of hardware components like those of basic computing device 500 described below with respect to FIG. 8.

The first database 150 may include one or more processors (e.g., CPUs), a network interface, and memory. The processor(s) may be configured to execute computer instructions that are stored in one or more computer-readable media, for example, the memory of the first database 150. The database 150 may include a network interface that is configured to allow the database 150 to transmit and receive data in one or more networks. The network interface may include one or more network interface cards (NICs). The memory of the database 150 may store data or instructions. The instructions stored in the memory may include the database server module 152.

The second database 160 may include a database server module 162 for storing and retrieving data including the data summary statistics 154 and the obfuscated data 156. The second database 160 may be implemented as a single server computing device or as multiple server computing devices arranged in a distributed or clustered computing arrangement. Each such server computing device may be composed of hardware components like those of basic computing device 500 described below with respect to FIG. 8.

The second database 160 may include one or more processors (e.g., CPUs), a network interface, and memory. The processor(s) may be configured to execute computer instructions that are stored in one or more computer-readable media, for example, the memory of the second database 160. The second database 160 may include a network interface that is configured to allow the database 160 to transmit and receive data in one or more networks. The network interface may include one or more network interface cards (NICs). The memory of the second database 160 may store data or instructions. The instructions stored in the memory may include the database server module 162.

Binary Data Item Extraction Method

Figure 2:
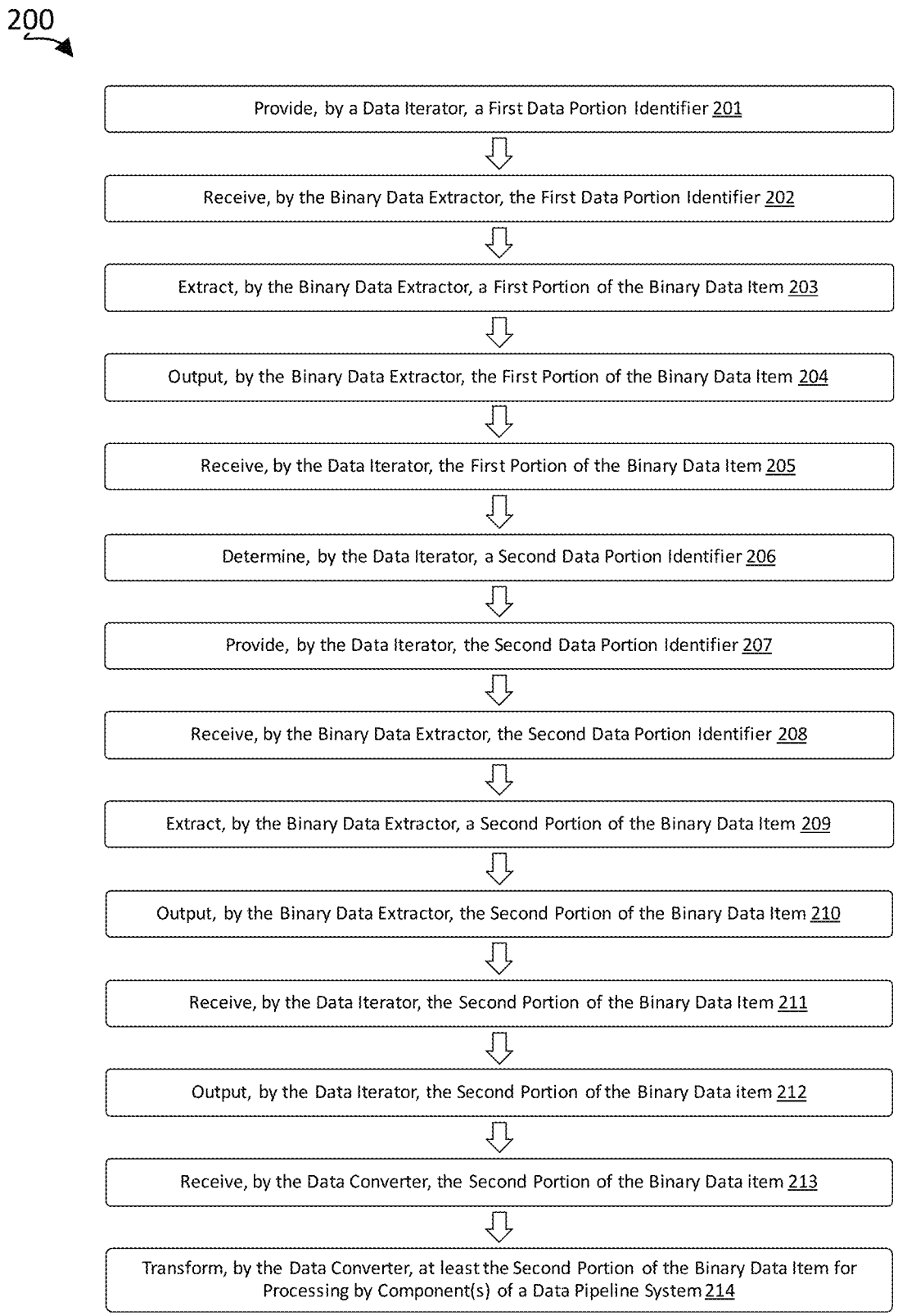
FIG. 2 is a flow diagram illustrating an example method for extracting portions of a binary data item, in accordance with example embodiments.

FIG. 2 is a flowchart illustrating an example method 200 by which extraction of data items is provided. The method 200 is performed by computer-readable instructions, e.g. software, for execution by one or more processors of one or more computing devices (e.g., the basic computing device 500 of FIG. 8). In one embodiment, the one or more computing devices are part of a data pipeline system 130. The method 200 is performed using a number of software components including a data iterator, a binary data extractor and a data converter. These software components may be any of or any combination of sequences of instructions, interpretable code, loadable modules, dynamic link libraries and/or computer programs.

At step 201, a first data portion identifier is provided, by the data iterator, to a binary data extractor. The first data portion identifier may be provided to the data iterator using any suitable mechanism, e.g. an application programming interface (API) call, a system call, a function call, a remote service call, or via a representational state transfer (REST) operation. The first data portion identifier may be a low-level indicator of a segment of the binary data item. For example, the first data portion identifier may include at least one of a data superframe identifier, a data frame identifier, a data subframe identifier, a data word identifier and/or a data line identifier. An example of a binary data item format whereby data may be extracted using the above identifiers is described in relation to FIG. 3. The first data portion identifier may alternatively or additionally include a byte number or byte range.

At step 202, the first data portion identifier is received by the binary data extractor. The first data portion identifier may be received using any suitable mechanism, e.g. an application programming interface (API) call, a system call, a function call, a remote service call, or via a representational state transfer (REST) operation.

At step 203, a first portion of a binary data item is extracted, by the binary data extractor, based on the first data portion identifier. The first portion of the binary data item may be extracted by using the first data portion identifier to locate and read the relevant portion of the binary data item. A larger portion of the binary data item than that identified by the data portion identifier may be loaded in to a memory, e.g. a random access memory, of the one or more computing devices such that further portions of the binary data item 1 are present in the memory. If a data portion identifier subsequently received by the binary data extractor identifies one or more of these loaded portions then the binary data extractor may utilize these already loaded portions reducing the number of reads of the binary data item.

At step 204, the first portion of the binary data item is outputted by the binary data extractor. The first portion of the binary data item may be outputted by any suitable mechanism. For example, the first portion of the binary data item may be outputted by returning the first portion of the binary data item in response to a function call, system call, an API call, a remote service call or a REST operation. The call or operation may have included the data portion identifier or the data portion identifier may have been included in an earlier call, i.e. the outputting may be synchronous or asynchronous. Alternatively or additionally, the first portion of the binary data item may be outputted by storing it in memory shared by one or more processes and/or threads.

At step 205, the first portion of the binary data item is received, by the data iterator, from the binary data extractor. The first portion of the binary data item may be received via any suitable mechanism e.g. an API call, a system call, a function call, a remote service call, or via a REST operation. The first portion of the binary data item may be received in response to providing the first data portion identifier or it may be received in a later operation, i.e. the receiving may be synchronous or asynchronous.

The data iterator may use a buffer to keep portions of the binary data item available to the data iterator for random access. The content in the buffer may be replaced as further portions of the binary data item are received. The buffer used by the data iterator may be small, e.g. use a small amount of memory compared to the amount of memory used by the binary data extractor for storing the further portions of the binary data item.

In some embodiments, the first portion of the binary data item may be outputted by the data iterator. The first portion of the binary data item may be outputted by the data iterator using any suitable mechanism. For example, the first portion of the binary data item may be outputted by returning the portion of the binary data item in response to a function call, system call, an API call, a remote service call or a REST operation. The call or operation may have included the first data portion identifier or the first data portion identifier may have been included in an earlier call, i.e. the outputting may be synchronous or asynchronous. Alternatively or additionally, the first portion of the binary data item may be outputted by storing it in memory shared by one or more processes and/or threads.

In embodiments where the first portion of the binary data item is outputted by the data iterator, the first portion of the binary data item may be received, by the data converter, from the data iterator. The first portion of the binary data item may be received using any suitable mechanism e.g. an API call, a system call, a function call, a remote service call, or via a REST operation.

At step 206, a second data portion identifier is determined by the data iterator.

The second data portion identifier may be determined based on the first data portion identifier. The second data portion identifier may be determined by incrementing, or performing another arithmetic operation on, one or more aspects of the first data portion identifier. For example, a data superframe identifier, a data frame identifier, a data subframe identifier and/or a data word identifier may be incremented. Where the first portion of the binary data item is representative of a certain parameter recorded at a given time step, the second data portion identifier may be determined, e.g. by incrementing the first data portion identifier, such that it identifies a portion of the binary data item representative of the same parameters at a later time step. For example, data representative of a parameter, e.g. altitude, may be in the binary data item once every data frame, where each data frame may correspond to data recorded over a time period of a given length e.g. four seconds, at the same data subframe and word locations, so by incrementing the data frame identifier but holding the other aspects of the data portion identifier constant, the next instance of data representative of the same parameter may be located.

The second data portion identifier may be identified based on the first portion of the binary data item. The first portion of the binary data item may include a reference to a second portion of the binary data item, e.g. a byte address or data superframe, frame, subframe, and/or word identifiers. The second data portion identifier may be determined based on the reference such that it identifies the relevant portion of the binary data item.

At step 207, the second data portion identifier is provided, by the data iterator, to the binary data extractor. The second data portion identifier may be provided using any of the same mechanisms which may be used to provide the first data portion identifier.

At step 208, the second data portion identifier is received by the binary data extractor. The second data portion identifier may be received using any of the same mechanisms by which the first data portion identifier may be received.

At step 209, the second portion of the binary data item is extracted, by the binary data extractor, based on the second data portion identifier. The second portion of the binary data item may be extracted using any of the same mechanisms by which the first portion of the binary data item may be extracted.

At step 210, the second portion of the binary data item is outputted by the binary data extractor. The second portion of the binary data item may be outputted using any of the mechanisms by which the first portion of the binary data item may be outputted.

As step 211, the second portion of the binary data item is received, by the data iterator, from the binary data extractor. The second portion of the binary data item may be received using any of the mechanisms by which the first portion of the binary data item may be received.

At step 212, the second portion of the binary data item is outputted by the data iterator. The second portion of the binary data item may be outputted by the data iterator using any suitable mechanism. For example, the second portion of the binary data item may be outputted by returning the portion of the binary data item in response to a function call, system call, an API call, a remote service call or a REST operation. The call or operation may have included the first data portion identifier or the first data portion identifier may have been included in an earlier call, i.e. the outputting may be synchronous or asynchronous. Alternatively or additionally, the second portion of the binary data item may be outputted by storing it in memory shared by one or more processes and/or threads.

At step 213, the second portion of the binary data item is received, by the data converter, from the data iterator. The second portion of the binary data item may be received using any of the mechanisms by which the first portion of the binary data item may be received.

At step 214, at least the second portion of the binary data item are transformed, by the data converter, based on a data format specification, for processing by one or more components of a data pipeline system. Where the first portion of the binary data item is received by the data converter, the first and second portions of the binary data item may be transformed.

The binary data may be transformed to a numerical value. The numerical value may be in a floating point format, e.g. an IEEE754 format, or in an integer format, e.g. a 32-bit or 64-bit signed or unsigned integer. The binary data may be transformed to a numerical value based on a scaling factor included in the data format specification. The scaling factor may be determined based on the data format specification by extracting or reading it from the specification. The scaling factor may be a single number indicating a top end of a range or may comprise two or more numbers indicating a top and a bottom end of a range. The use of these specific scaling factors for given binary data portions, which may correspond to specific parameters, facilitates the binary data item representing numbers efficiently, in terms of the number of bits used, and with a high precision. For example, if it is known that a given parameter, e.g. a temperature, is between 0 and 100 then it can be represented to a precision of $100/2^{11} \approx 0.05$ with 12 bits. Standard numerical formats are designed to handle numbers over a much greater range so would not be capable of representing the number accurately with as high a precision using this number of bits.

The binary data may be transformed to a string value. For example, the binary data may be transformed to an ASCII or Unicode string format from a compact binary representation.

Binary Data Item Format

Figure 3:
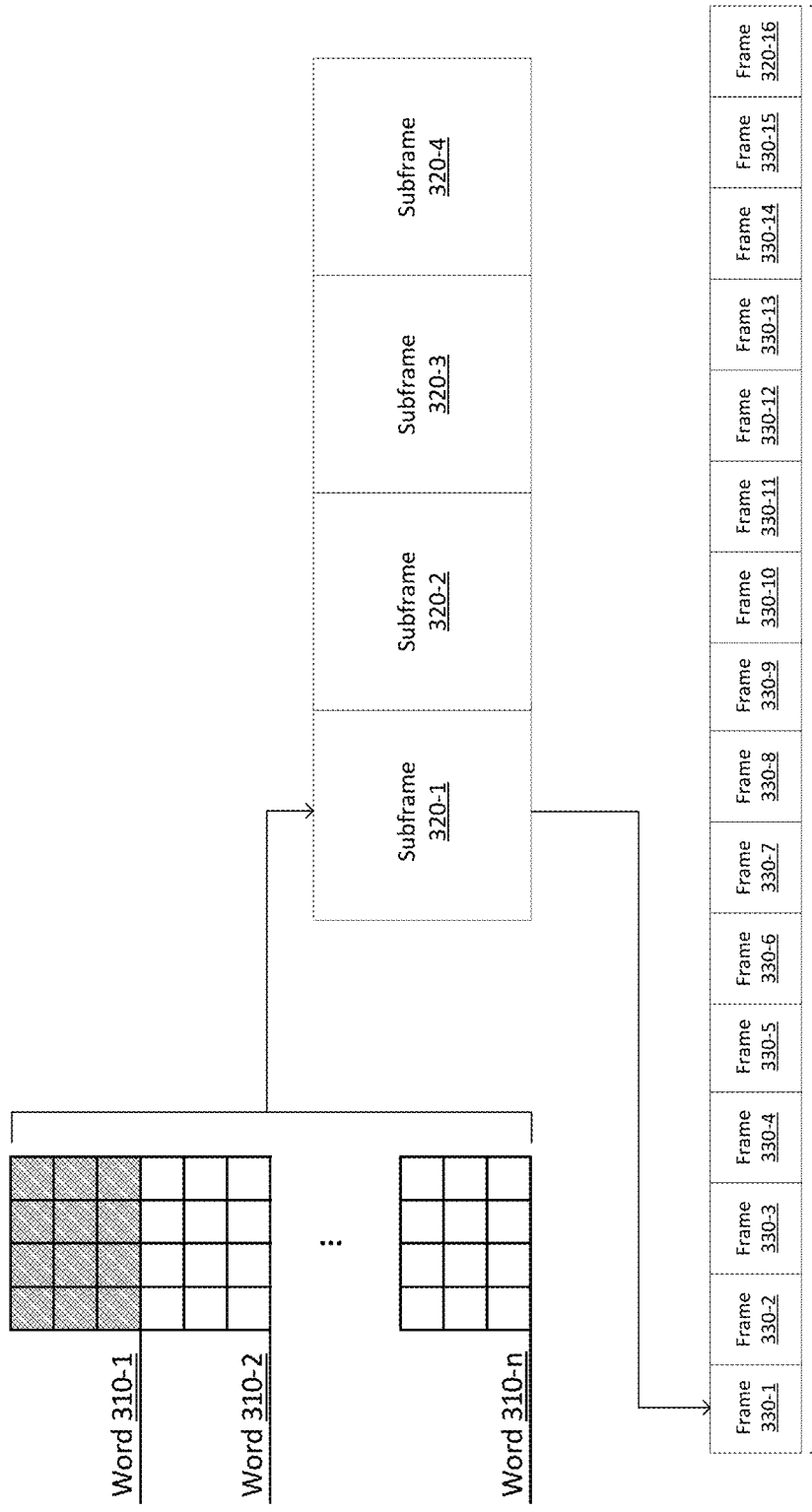
FIG. 3 is a schematic diagram of a binary data item format, in accordance with example embodiments.

Referring now to FIG. 3, a schematic diagram of a binary data item format 300 is shown, usable with the subject innovations in example embodiments. For example, the binary data item format 300 may be used for the binary data items described in relation to computer system 100 and method 200.

In the binary data item format 300, a binary data item comprises a plurality of superframes 340, each of the superframes comprises a plurality of frames 330 and each of the subframes 320 comprises a plurality of words 310.

Each data word 310 may consist of a fixed number of bits, e.g. 12 bits.

Each subframe 320 may consist of a fixed number of data words, e.g. 64, 128, 256 or 512. Each subframe 320 may represent parameters recorded over a set time period, e.g. one second. Parameters that are recorded at a high frequency may be recorded one or more times per subframe. For example, if the binary data item represents data recorded by an airplane or a car, acceleration may be recorded one or more times per a subframe.

Each frame 330 may consist of a fixed number of subframes 320, e.g. four. Each frame 330 may represent parameters recorded over a set time period, e.g. four seconds. Certain parameters may be recorded once per frame.

Each superframe 340 may consist of a fixed number of frames 330, e.g. 16. Each superframe 340 may represent parameters recorded over a set time period, e.g. 64 seconds. Parameters that change infrequently may be recorded once per superframe. For example, if the binary data item represents data recorded by an airplane then date, hour and flight number may be recorded once per superframe.

Location Data Modification Method

Figure 4:
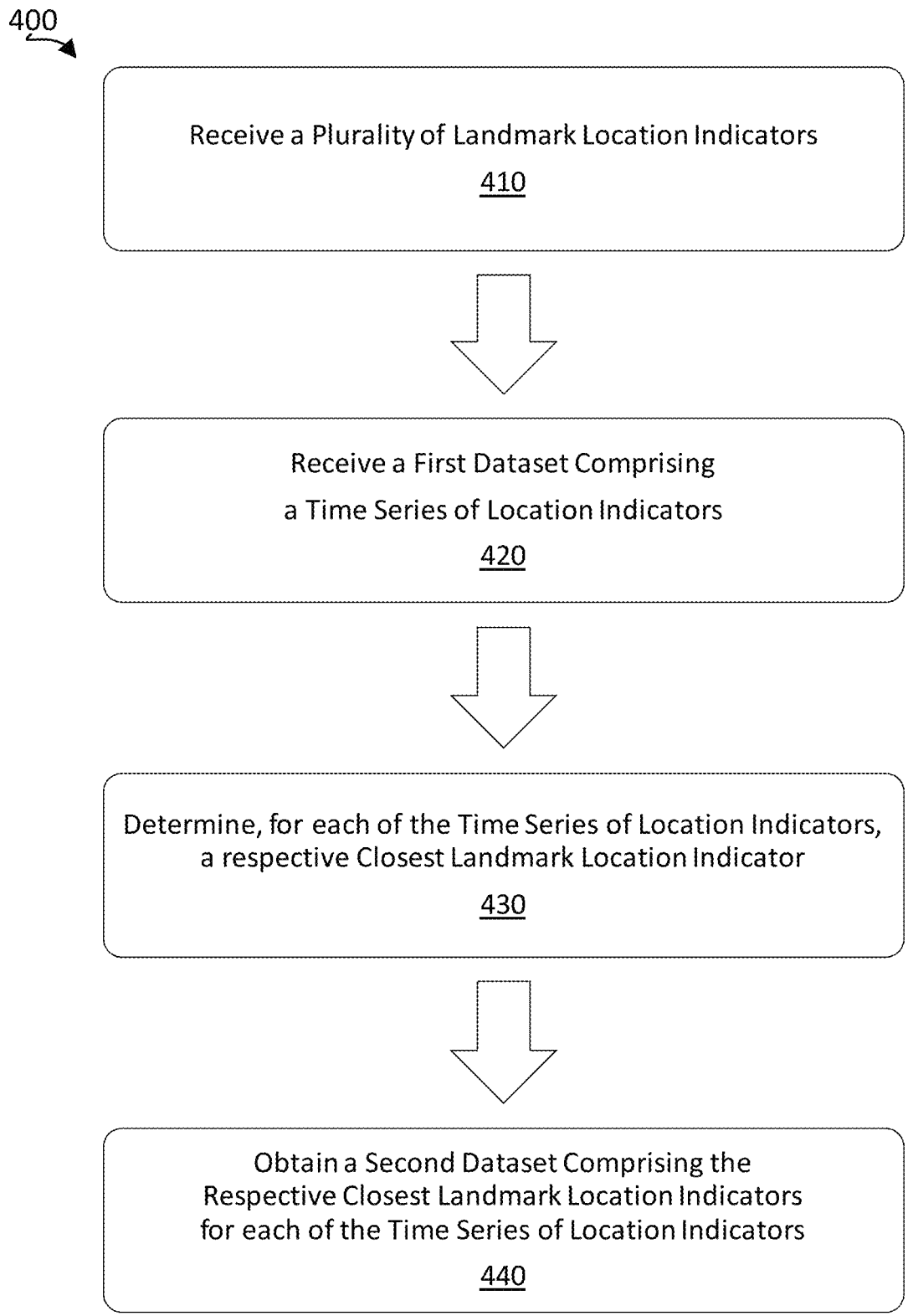
FIG. 4 is a flow diagram illustrating an example method suitable for modifying location data, in accordance with example embodiments.

FIG. 4 is a flowchart illustrating an example method 400 by which modification of location data is provided. The method 400 is performed by computer-readable instructions, e.g. software, for execution by one or more processors of one or more computing devices (e.g., the basic computing device 500 of FIG. 8). In one embodiment, the one or more computing devices are part of a data pipeline system 130.

At step 410, a plurality of landmark location indicators is received.

The plurality of landmark location indicators may be received using any suitable mechanism, e.g. an application programming interface (API) call, a system call, a function call, a remote service call, or via a representational state transfer (REST) operation. Receiving the plurality of landmark location indicators may include retrieving the plurality of landmark location indicators from a database, shared memory and/or a file.

Each of the plurality of landmark location indicators may represent a location of a landmark or may be a reference to such data, where a landmark is a location which may be used as a reference point. In an aviation context, the plurality of landmark location indicators may each represent the location of an airport. In an automotive context, the plurality of landmark location indicators may each represent the location of a gas station. In a domestic robot context, the plurality of landmark location indicators may each represent a center of a room. The landmark locations may be represented using any suitable format. For example, in an aviation context, each of the landmark locations may be represented using numbers for longitude and latitude. In an automotive context, each of the landmark locations may be represented as North-South and East-West distances in miles or kilometers from a reference point. In a domestic robot context, the landmark locations may be represented as (x, y) coordinates in meters.

At step 420, a first dataset comprising a time series of location indicators is received. Access to the first dataset may be restricted to a first one or more users. Access to the first dataset may be restricted for reasons of security, privacy and/or confidentiality.

The first dataset may be received using any of the mechanisms by which the plurality of landmark location indicators may be received.

Each of the time series of location indicators may be represented in any suitable format, e.g. any of the representations which may be used to describe the landmark location. The same format may be used for the location indicators as for the landmark location indicators.

As step 430, a respective closest landmark location indicator of the plurality of landmark location indicators is determined for each of the time series of location indicators, i.e. for each of the locations in the time series, the closest landmark may be determined. The closest landmark location indicators may be determined using the method 600 described in relation to FIG. 5 or by another suitable method, e.g. by using a quadtree. Closest may be defined according to any suitable distance metric, e.g. Haversine distance, Euclidean distance or Manhattan distance.

At step 440, a second dataset is obtained, based on the first dataset, where the second dataset comprises the respective closest landmark location indicator for each of the time series of location indicators. For example, the second dataset may be similar to the first dataset but with the location indicators of the time series replaced with the respective closest landmark location indicators. Replacing the location indicators with closest landmark location indicators may obfuscate the location data such that the precise location of the relevant entity, e.g. a car, a plane or a domestic robot, cannot be determined. Furthermore, replacing the location indicators may prevent a particular entity being identified. Very precise location data may identify a particular entity, even if other aspects of the dataset are obfuscated, while the closest landmark location indicator is sufficiently imprecise that they may not be. For example, there may be several planes close to an airport and several cars close to a gas station so an individual plane or car cannot be identified using information about the closest airport or gas station alone. However, information about the closest landmark location may be sufficient for useful analysis to be performed. Thus, the described method may facilitate functional analysis of data while preserving security and privacy.

Closest Landmark Location Indicators Determination Method

FIG. 5 is a flowchart illustrating an example method 600 by which a respective closest landmark location indicator of a plurality of landmark location indicators for each of a time series of location indicators may be determined. The method 600 is performed by computer-readable instructions, e.g. software, for execution by one or more processors of one or more computing devices (e.g., the basic computing device 500 of FIG. 8). In one embodiment, the one or more computing devices are part of a data pipeline system 130.

At step 610, a first closest landmark location indicator for a first location indicator in a time series of location indicators is determined. The first location indicator may be an initial location indicator. The first closest landmark location indicator may be determined by performing a brute force search. For example, a distance may be calculated between each of the landmark locations and the location indicated by the first location indicated. The first closest landmark location indicator determined to be the indicator for the landmark location with the smallest associated distance.

At step 620, a second closest landmark location indicator for a second location indicator in the time series of location indicators is determined. The second location indicator may be subsequent to the first location indicator in the time series. The second closest landmark location indicator may be determined using a method comprising the below operations.

At step 622, a distance is determined based on the second location indicator and the first closest landmark location indicator. The distance may be the distance between the location indicated by the second location indicator and the location indicated by the first closest landmark location indicator.

At step 624, a bounding area is calculated based on the distance. The bounding area may be centered on the location indicated by the second location indicator. The bounding area may be of any appropriate shape. For example, the bounding area may be a circle having a radius of the distance or the bounding area may be a square having sides of twice the distance.

At step 626, a second closest landmark location indicator is determined based on the bounding area. The bounding area may be used to limit the number of landmark location indicators evaluated when determining the second closest landmark location indicator. The use of the bounding area may improve the efficiency with which the second closest landmark location indicator may be determined. For example, the second closest landmark location indicator may be determined based on the bounding area according to the method 700 described in relation to FIG. 6.

Closest Landmark Location Indicator Determination Method

Figure 6:
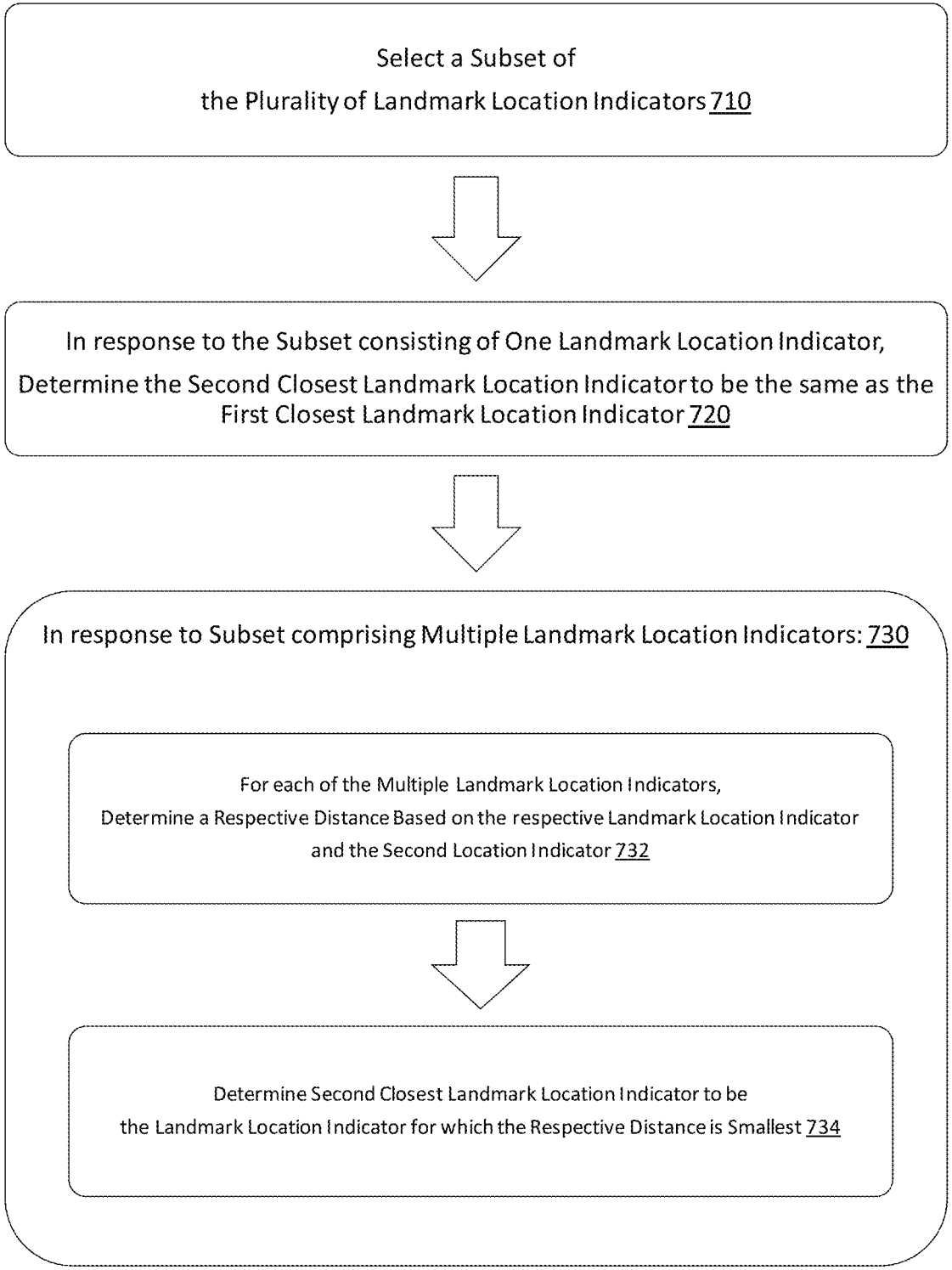
FIG. 6 is a flow diagram illustrating an example method for determining a closest landmark location indicator for a location indicator, in accordance with example embodiments.

FIG. 6 is a flowchart illustrating an example method 700 by which a closest landmark location indicator for a landmark location indication may be determined based on a bounding area. The method 600 is performed by computer-readable instructions, e.g. software, for execution by one or more processors of one or more computing devices (e.g., the basic computing device 500 of FIG. 8). In one embodiment, the one or more computing devices are part of a data pipeline system 130.

At step 710, a subset of a plurality of landmark location indicators is selected based on the bounding area. The subset may be selected by filtering the plurality of landmark location indicators to those located within the bounding area. This may be performed by comparing each of the locations represented by the plurality of landmark location indicators to the boundaries of the bounding area to determine whether each location is within or outside the bounding area. If the location is within the bounding area, it is included in the subset. If the location is outside the bounding area, it is not included in the subset.

At step 720, in response to the subset consisting of one landmark location indicator, the closest landmark location indicator is determined to be the same as the landmark location indicator used to calculate the bounding area. As, if the subset consists of one landmark location indicator, it is the landmark location indicator used to calculate the bounding area. This landmark location indicator is the previous location indicator. In the context of methods 600, the second closest landmark location indicator is determined to be the same as the first landmark location indicator.

At step 730, in response to the subset comprising multiple landmark location indicators, the following operations are performed.

At step 732, a respective distance is determined, for each of the multiple landmark location indicators, based on the respective landmark location indicator and the location indicator. The distance may be determined using any suitable distance metric, e.g. Haversine distance, Euclidean distance or Manhattan distance.

At step 734, the closest landmark location indicator is determined to be the landmark location indicator of the multiple landmark location indicators for which the respective distance is smallest.

Closest Landmark Location Determination Scenarios

Figure 7:
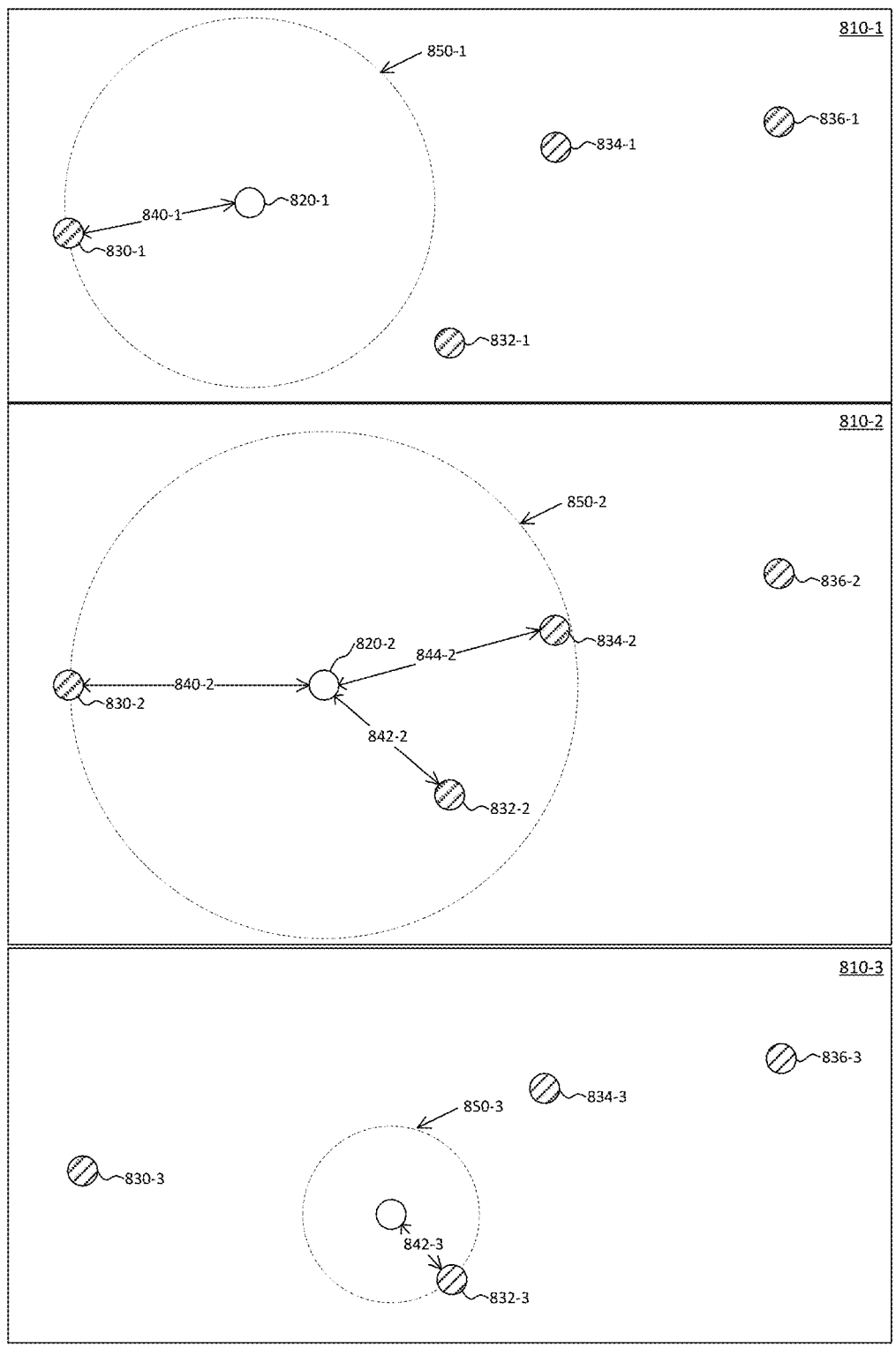
FIG. 7 illustrates scenarios in which closest landmark locations to a given location may be determined, in accordance with example embodiments.

FIG. 7 illustrates scenarios 800 in which closest landmark locations to a given location may be determined.

In each of the illustrated scenarios 810-1, 810-2, 810-3, the location 820 indicated by a location indicator is shown. A plurality of landmark locations 830-836 indicated by landmark location indicators are also shown. The bounding areas 850 used in determining the closest landmark location are also shown.

In scenarios 810-1 and 810-2, the distance between the location 820 and the landmark location 830, is used to calculate the bounding area, as in these scenarios, landmark location 830 is the previous closest landmark location.

In scenario 810-1, there is a single landmark location 830-1 in the bounding area 850-1. The closest landmark location is determined to be the previous closest landmark location 830-1.

In scenario 810-2, there are three landmark locations 830-2, 832-2, 834-2 in the bounding area 850-2. Distances 840-2, 842-2, 844-2 are calculated between the location and each of the landmark locations. The smallest distance is the distance 842-2 between the location 830 and landmark location 832-2 so landmark location 832-2 is determined to be the closest landmark location.

In scenario 810-3, the previous closest landmark location is landmark location 832-3. The bounding area 850-3 is calculated using distance 842 and is smaller than in the previous scenarios. There is a single landmark location in the bounding area 850-3. The closest landmark location is determined to be the previous closest landmark location 832-3.

Basic Computing Device

Figure 8:
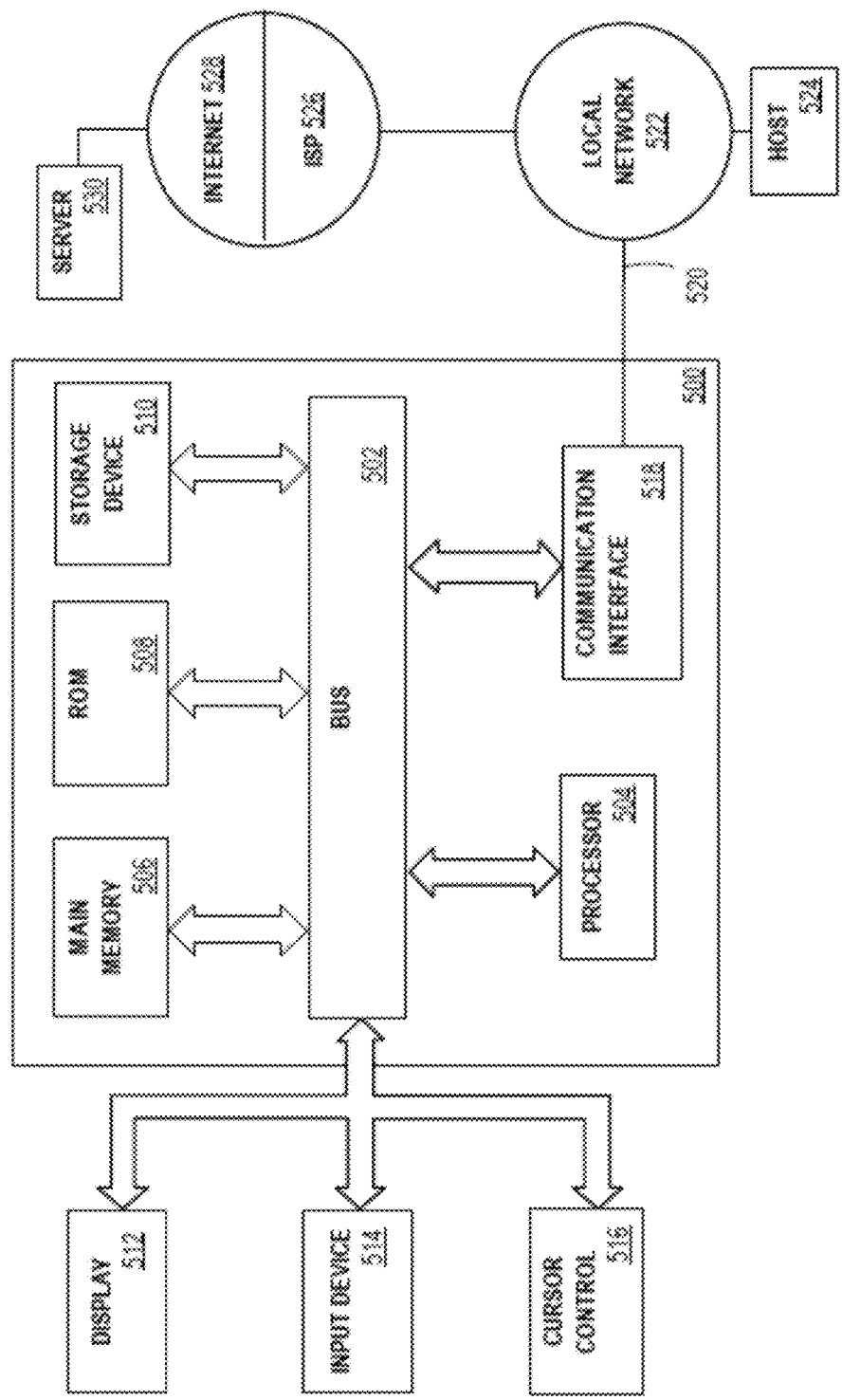
FIG. 8 is a schematic diagram of a computing device in which software-implemented processes of the example embodiments may be embodied.

Referring now to FIG. 8, it is a block diagram that illustrates a basic computing device 500 in which software-implemented processes of the subject innovations may be embodied. Computing device 500 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor suitable for implementing the subject innovations.

Main memory 506, such as a random access memory (RAM) or other dynamic storage device, also may be coupled to bus 502 for storing information and instructions to be executed by processor(s) 504. Main memory 506 also may be used for storing temporary variables or other intermediate information during execution of software instructions to be executed by processor(s) 504.

Such software instructions, when stored in non-transitory storage media accessible to processor(s) 504, render computing device 500 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and instructions for processor(s) 504.

One or more mass storage devices 510 may be coupled to bus 502 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such instructions may be read into main memory 506 from another storage medium, such as storage device(s) 510. Execution of the software program instructions contained in main memory 506 cause processor(s) 504 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid-state drive of a remote computer. The remote computer can load the instructions into its dynamic memory and send the instructions over a telephone line using a modem. A modern local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution The above-described basic computer hardware is presented for purpose of illustrating the basic underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

EXTENSIONS AND ALTERNATIVES

It is understood that any specific order or hierarchy of steps in the methods disclosed are an illustration of example approaches. Based upon design preferences, it is understood that the specific order or hierarchy of steps in the methods may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

The invention claimed is:

1. A data pipeline system comprising:
a binary data extractor configured to:
receive a data portion identifier;
extract a portion of a binary data item based on the data portion identifier; and
output the portion of the binary data item;
a data iterator configured to:
provide a first data portion identifier to the binary data extractor;
receive, from the binary data extractor, a first portion of the binary data item;
determine a second data portion identifier;
provide the second data portion identifier to the binary data extractor;
receive, from the binary data extractor, a second portion of the binary data item; and
output the second portion of the binary data item; and
a data converter configured to:
receive, from the data iterator, the first portion of the binary data item;
receive, from the data iterator, the second portion of the binary data item; and
transform, based on a data format specification, at least the second portion of the binary data item for processing by one or more other components of the data pipeline system.

2. The data pipeline system of claim 1, wherein the data portion identifier comprises at least one of a data superframe identifier, a data frame identifier, a data subframe identifier, a data word identifier or a data line identifier.

3. The data pipeline system of claim 1, wherein determining the second data portion identifier comprises extracting, from the first portion of the binary data item, a reference to a second portion of the binary data item, and wherein the second data portion identifier is based on the reference to the second portion of the binary data item.

4. The data pipeline system of claim 1, wherein one or more components of the data pipeline system are configured to store the transformation of at least the second portion of the binary data item to a database, wherein access to the database is restricted to one or more users.

5. The data pipeline system of claim 1, wherein transforming at least the second portion of the binary data item comprises:
   determining a scaling factor based on the data format specification; and
   transforming at least part of the second portion of the binary data item to a numerical value based on the scaling factor.

6. The data pipeline system of claim 5, wherein the numerical value is in a floating point format.

7. A method, performed by one or processors, comprising:
   providing, by a data iterator, a first data portion identifier to a binary data extractor;
   receiving, by the binary data extractor, the first data portion identifier;
   extracting, by the binary data extractor, a first portion of a binary data item based on the first data portion identifier;
   outputting, by the binary data extractor, the first portion of the binary data item;
   receiving, by the data iterator, the first portion of the binary data item from the binary data extractor;
   determining, by the data iterator, a second data portion identifier;
   providing, by the data iterator, the second data portion identifier to the binary data extractor;
   receiving, by the binary data extractor, the second data portion identifier;
   extracting, by the binary data extractor, a second portion of the binary data item based on the second data portion identifier;
   outputting, by the binary data extractor, the second portion of the binary data item;
   receiving, by the data iterator, the second portion of the binary data item from the binary data extractor;
   outputting, by the data iterator, the second portion of the binary data item;
   receiving, by a data converter, the second portion of the binary data item, from the data iterator; and
   transforming, by the data converter, based on a data format specification, the at least the second portion of the binary data item for processing by one or more components of a data pipeline system.

8. The method of claim 7, wherein the first data portion identifier and the second data portion identifier each comprise at least one of a data frame identifier, a data subframe identifier or a data word identifier.

9. The method of claim 7, wherein determining the second data portion identifier comprises extracting, from the first portion of the binary data item, a reference to a second portion of the binary data item, and wherein the second data portion identifier is based on the reference to the second portion of the binary data item.

10. The method of claim 7, further comprising storing the transformation of at least the second portion of the binary data item to a database, wherein access to the database is restricted to one or more users.

11. The method of claim 7, wherein transforming at least the second portion of the binary data item comprises:
   determining a scaling factor based on the data format specification; and
   transforming at least part of the second portion of the binary data item to a numerical value based on the scaling factor.

12. The method of claim 11, wherein the numerical value is in a floating point format.

13. Apparatus comprising one or more processors or special-purpose computing hardware configured to:
   provide, by a data iterator, a first data portion identifier to a binary data extractor;
   receive, by the binary data extractor, the first data portion identifier;
   extract, by the binary data extractor, a first portion of a binary data item based on the first data portion identifier;
   output, by the binary data extractor, the first portion of the binary data item;
   receive, by the data iterator, the first portion of the binary data item from the binary data extractor;
   determine, by the data iterator, a second data portion identifier;
   provide, by the data iterator, the second data portion identifier to the binary data extractor;
   receive, by the binary data extractor, the second data portion identifier;
   extract, by the binary data extractor, a second portion of the binary data item based on the second data portion identifier;
   output, by the binary data extractor, the second portion of the binary data item;
   receive, by the data iterator, the second portion of the binary data item from the binary data extractor;
   output, by the data iterator, the second portion of the binary data item;
   receive, by a data converter, the second portion of the binary data item, from the data iterator; and
   transform by the data converter, based on a data format specification, the at least the second portion of the binary data item for processing by one or more components of a data pipeline system.

14. A method, performed by one or more processors, comprising:
   receiving a plurality of landmark location indicators;
   receiving a first dataset comprising a time series of location indicators;
   determining, for each of the time series of location indicators, a respective closest landmark location indicator of the plurality of landmark location indicators wherein determining, for each of the time series of location indicators, a respective closest landmark location indicator of the plurality of landmark location indicators comprises:
      determining a first closest landmark location indicator for a first location indicator in the time series of location indicators;
      determining a second closest landmark location indicator for a second location indicator in the time series of location indicators by:

determining a distance based on the second location indicator and the first closest landmark location indicator;

calculating a bounding area based on the distance; and determining the second closest landmark location indicator based on the bounding area; and obtaining, based on the first dataset, a second dataset comprising the respective closest landmark location indicator for each of the time series of location indicators.

15. The method of claim 14, wherein determining the second closest landmark location indicator based on the bounding area comprises selecting a subset of the plurality of landmark location indicators based on the bounding area.

16. The method of claim 15, wherein determining the second closest landmark location indicator based on the bounding area further comprises:

in response to the subset consisting of one landmark location indicator, determining the second closest landmark location indicator to be the same as the first closest landmark location indicator.

17. The method of claim 15, wherein determining the second closest landmark location indicator based on the bounding area further comprises, in response to the subset comprising multiple landmark location indicators:

for each of the multiple landmark location indicators, determining a respective distance based on the respective landmark location indicator and the second location indicator; and determining the second closest landmark location indicator to be the landmark location indicator for which the respective distance is smallest.

18. The method of claim 14, wherein access to the first dataset is restricted to a first one or more users.

19. A computer program, optionally stored on a non-transitory computer readable medium, which, when executed by one or more processors of a data processing apparatus cause the data processing apparatus to:

provide, by a data iterator, a first data portion identifier to a binary data extractor;

receive, by the binary data extractor, the first data portion identifier;

extract, by the binary data extractor, a first portion of a binary data item based on the first data portion identifier;

output, by the binary data extractor, the first portion of the binary data item;

receive, by the data iterator, the first portion of the binary data item from the binary data extractor;

determine, by the data iterator, a second data portion identifier;

provide, by the data iterator, the second data portion identifier to the binary data extractor;

receive, by the binary data extractor, the second data portion identifier;

extract, by the binary data extractor, a second portion of the binary data item based on the second data portion identifier;

output, by the binary data extractor, the second portion of the binary data item;

receive, by the data iterator, the second portion of the binary data item from the binary data extractor;

output, by the data iterator, the second portion of the binary data item;

receive, by a data converter, the second portion of the binary data item, from the data iterator; and transform by the data converter, based on a data format specification, the at least the second portion of the binary data item for processing by one or more components of a data pipeline system.

* * * * *